(12) United States Patent
Malapati et al.

(10) Patent No.: US 10,864,876 B2
(45) Date of Patent: Dec. 15, 2020

(54) DEPLOYABLE PANEL FOR AN AIRBAG

(71) Applicant: Ford Global Technologies, LLC, Dearborn, MI (US)

(72) Inventors: Srinivas Reddy Malapati, Novi, MI (US); Mangesh Kadam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 16/263,975

(22) Filed: Jan. 31, 2019

(65) Prior Publication Data
US 2020/0247345 A1 Aug. 6, 2020

(51) Int. Cl.
*B60R 21/205* (2011.01)
*B60R 21/16* (2006.01)
*B60R 21/02* (2006.01)
*B60R 21/01* (2006.01)

(52) U.S. Cl.
CPC .. *B60R 21/205* (2013.01); *B60R 2021/01252* (2013.01); *B60R 2021/0273* (2013.01); *B60R 2021/161* (2013.01)

(58) Field of Classification Search
CPC ....... B60R 21/06; B60R 21/08; B60R 21/205; B60R 2021/01252; B60R 2021/024; B60R 2021/0273; B60R 2021/0293; B60R 2021/161
See application file for complete search history.

(56) References Cited

U.S. PATENT DOCUMENTS

| | | | |
|---|---|---|---|
| 4,298,214 A * | 11/1981 | Brown, Jr. ............ | B60R 21/213 280/735 |
| 4,948,168 A * | 8/1990 | Adomeit ................. | B60R 21/02 280/730.1 |
| 5,360,231 A * | 11/1994 | Adams ................... | B60R 21/205 280/728.1 |
| 6,616,182 B2 | 9/2003 | Woolley et al. | |
| 6,921,121 B2 * | 7/2005 | Schneider ............. | B60J 3/0204 280/730.1 |
| 7,380,821 B2 * | 6/2008 | Higuchi ................. | B60N 2/427 280/743.1 |
| 7,540,531 B2 | 6/2009 | Sakakibara et al. | |
| 8,465,049 B2 | 6/2013 | Tsujimoto | |
| 8,801,031 B1 * | 8/2014 | Zucal ..................... | B60R 21/213 280/728.3 |
| 9,346,417 B2 * | 5/2016 | Sitko .................... | B60R 13/0275 |
| 9,487,177 B2 | 11/2016 | Schneider et al. | |
| 9,845,069 B1 | 12/2017 | Owen | |
| 10,077,020 B2 | 9/2018 | Raikar et al. | |
| 10,457,241 B2 * | 10/2019 | Weerappuli ............ | B60R 21/01 |
| 10,507,783 B2 * | 12/2019 | Rupp .................... | B60R 21/239 |

(Continued)

*Primary Examiner* — Laura Freedman
(74) *Attorney, Agent, or Firm* — Frank A. MacKenzie; Bejin Bienman PLC

(57) ABSTRACT

An assembly includes a vehicle interior component. The assembly includes an airbag mounted to the vehicle interior component. The assembly includes a deployable panel supported by the vehicle interior component adjacent the airbag, the deployable panel being movable relative to the vehicle interior component between a retracted position and an extended position. The assembly includes a spring between the vehicle interior component and the deployable panel. The spring biases the deployable panel toward the extended position.

20 Claims, 6 Drawing Sheets

(56) References Cited

U.S. PATENT DOCUMENTS

| | | | |
|---|---|---|---|
| 2001/0033073 A1* | 10/2001 | Hammond | B60R 21/06 280/730.2 |
| 2008/0136144 A1 | 6/2008 | Spahr et al. | |
| 2020/0172039 A1* | 6/2020 | Ghannam | B60R 21/2035 |

* cited by examiner

DEPLOYABLE PANEL FOR AN AIRBAG

BACKGROUND

A vehicle may include one or more airbags deployable during a vehicle impact to control kinematics of occupants inside the vehicle. The airbag may be a component of an airbag assembly including a housing supporting the airbag. The airbag assembly includes an inflation device in communication with the airbag for inflating the airbag from an uninflated position to an inflated position.

DETAILED DESCRIPTION

Figure 1:
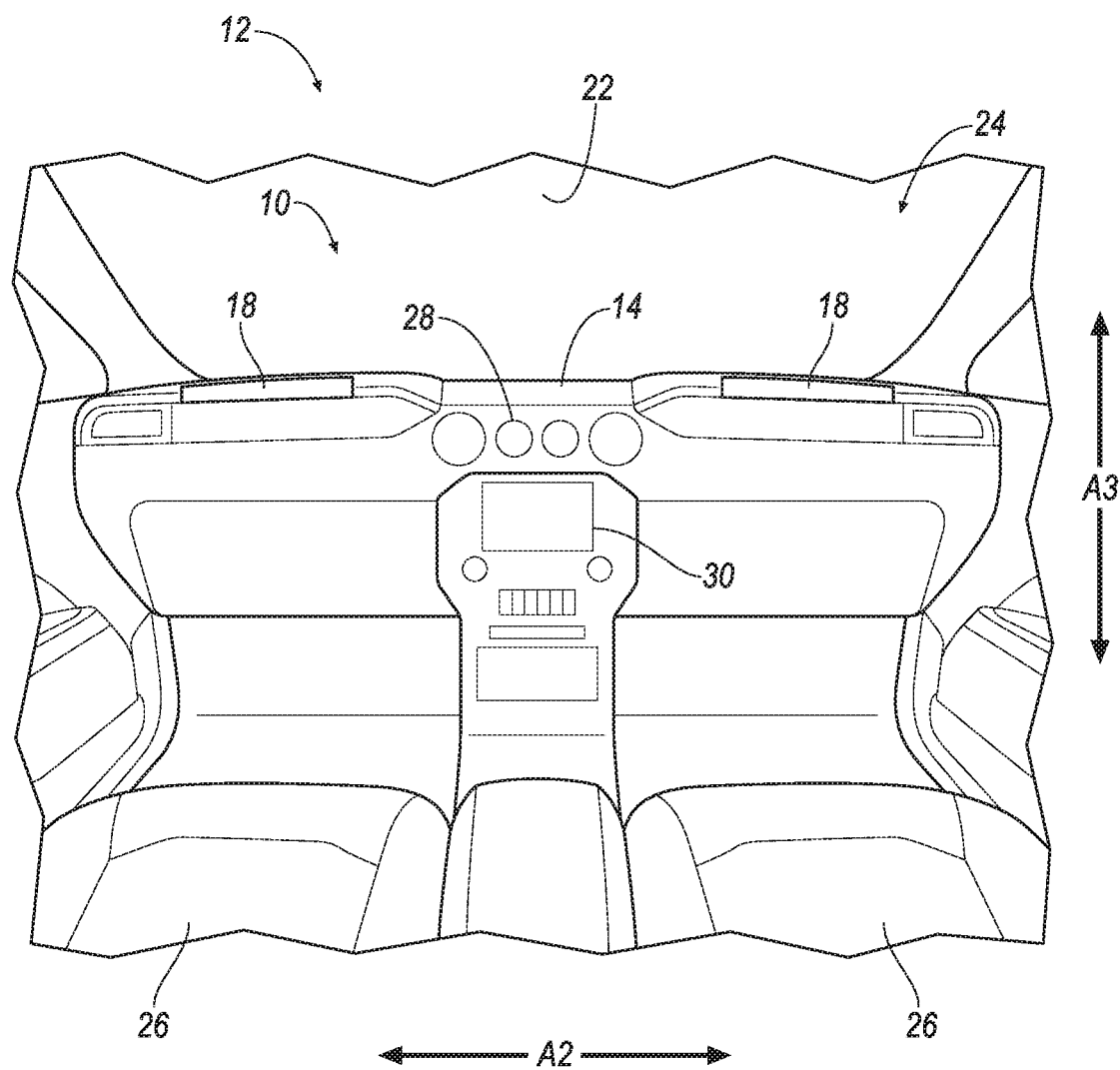
FIG. 1 is a forward view of a passenger cabin of a vehicle having an example assembly.

An assembly includes a vehicle interior component. The assembly includes an airbag mounted to the vehicle interior component. The assembly includes a deployable panel supported by the vehicle interior component adjacent the airbag, the deployable panel being movable relative to the vehicle interior component between a retracted position and an extended position. The assembly includes a spring between the vehicle interior component and the deployable panel. The spring biases the deployable panel toward the extended position.

The assembly may include an actuator releasably coupled to the deployable panel. The spring may bias the deployable panel toward the actuator. The actuator may be a pyrotechnic release.

The vehicle interior component may define a cavity, the deployable panel being in the cavity in the retracted position and extendable from the cavity to the extended position.

The assembly may include a slidable rail between the deployable panel and the vehicle interior component.

The deployable panel may be translatable between the retracted position and the extended position.

The assembly may include a windshield, the deployable panel being positioned to be between the airbag and the windshield in the extended position.

The deployable panel may have a reaction surface positioned to abut the airbag in an inflated position when the deployable panel is in the extended position.

The vehicle interior component may be an instrument panel.

The assembly may include a controller programmed to actuate an actuator in response to a vehicle impact.

The deployable panel may be rigid relative to the airbag.

The deployable panel may be elongated in a cross-vehicle direction.

With reference to the Figures, wherein like numerals designate like parts throughout the several views, an assembly 10 for a vehicle 12 includes a vehicle interior component 14. The assembly 10 includes an airbag 16 mounted to the vehicle interior component 14. The assembly 10 includes a deployable panel 18 supported by the vehicle interior component 14 adjacent the airbag 16. The deployable panel 18 is movable relative to the vehicle interior component 14 between a retracted position and an extended position. The assembly 10 includes a spring 20 between the vehicle interior component 14 and the deployable panel 18. The spring biases the deployable panel 18 toward the extended position.

Figure 3:
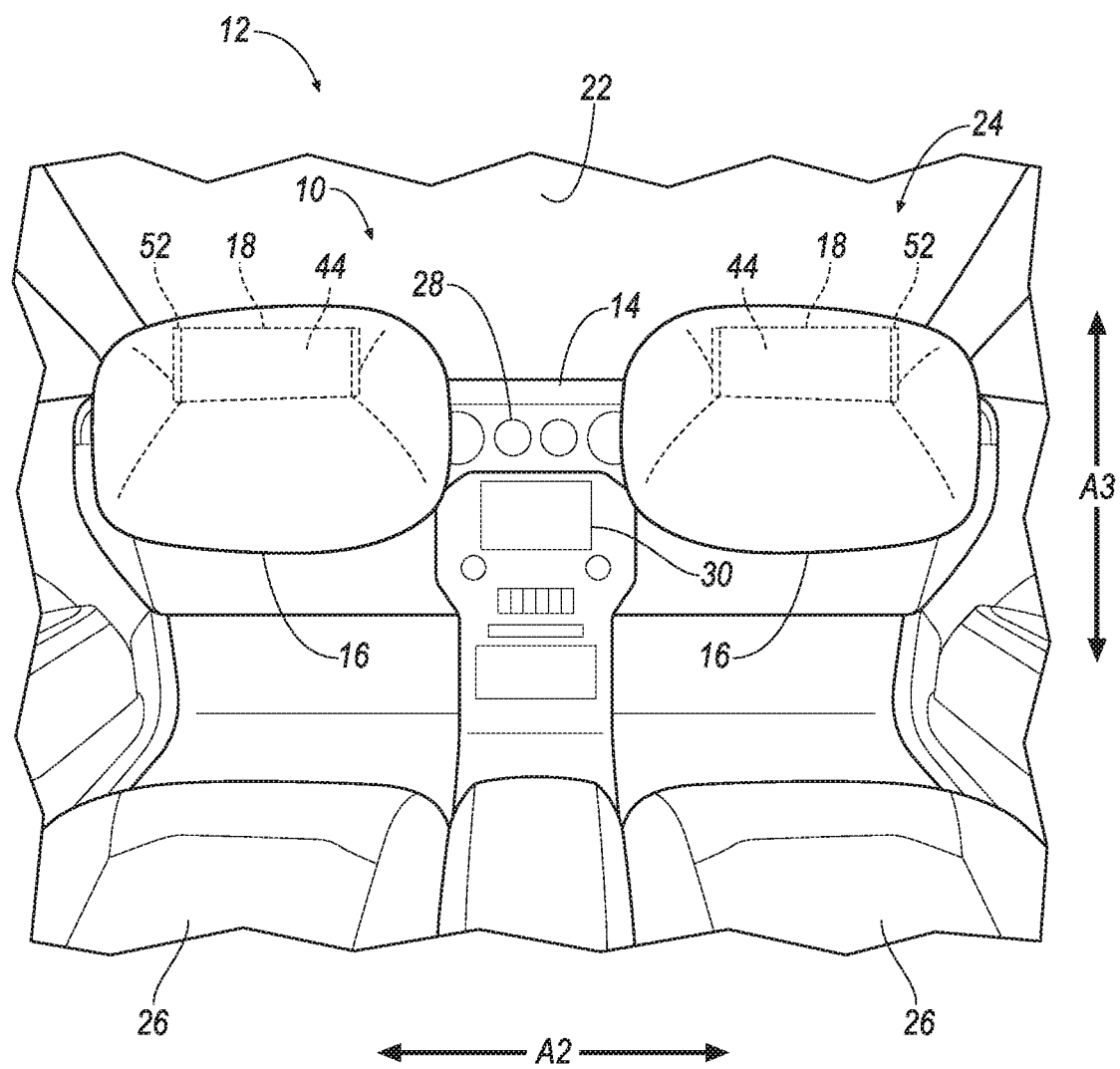
FIG. 3 is a forward view of the passenger cabin with the deployable panel of the example assembly in the extended position and an airbag in an inflated position.
Figure 4:
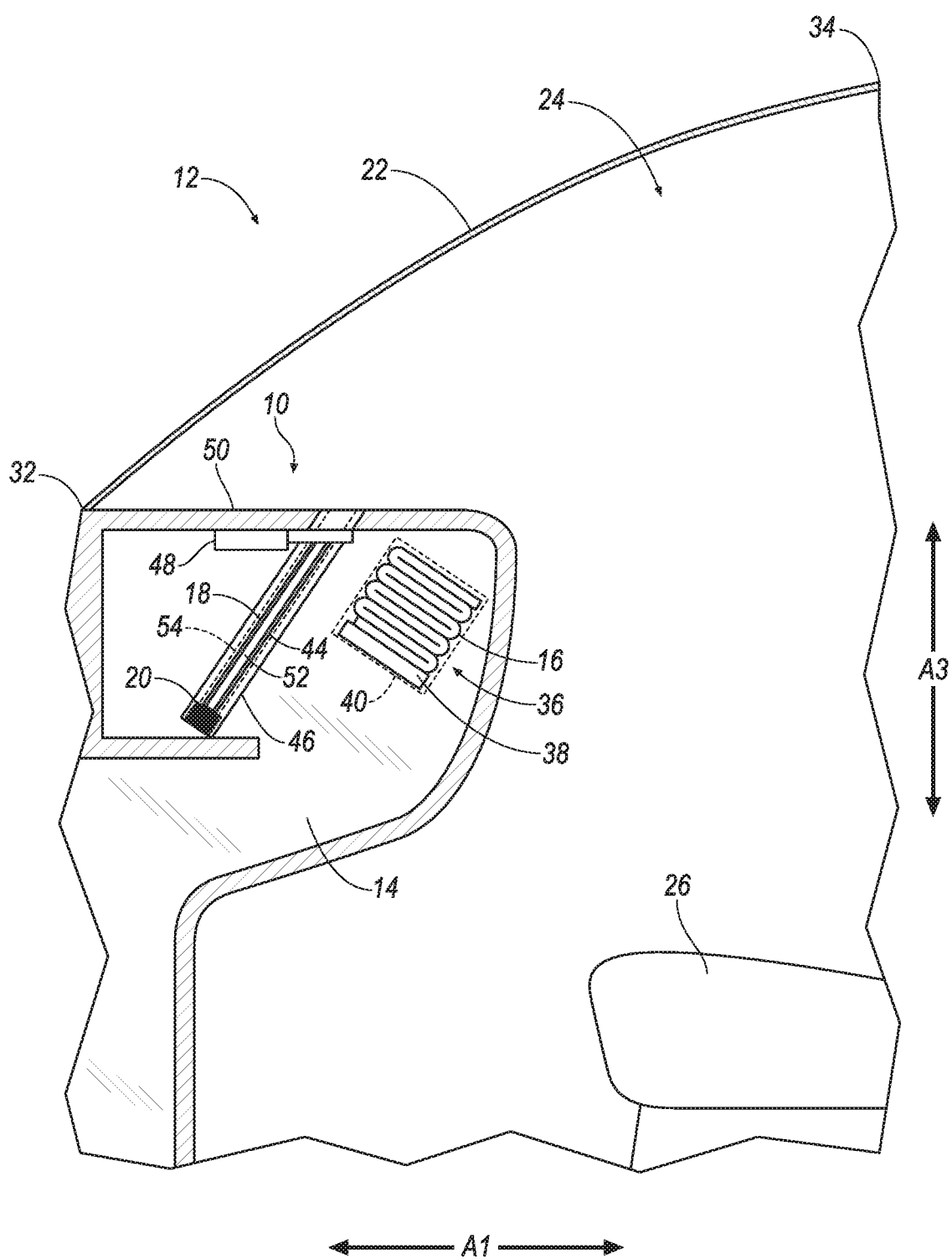
FIG. 4 is a cross-sectional view of the passenger cabin with the deployable panel of the example assembly in a retracted position.
Figure 5:
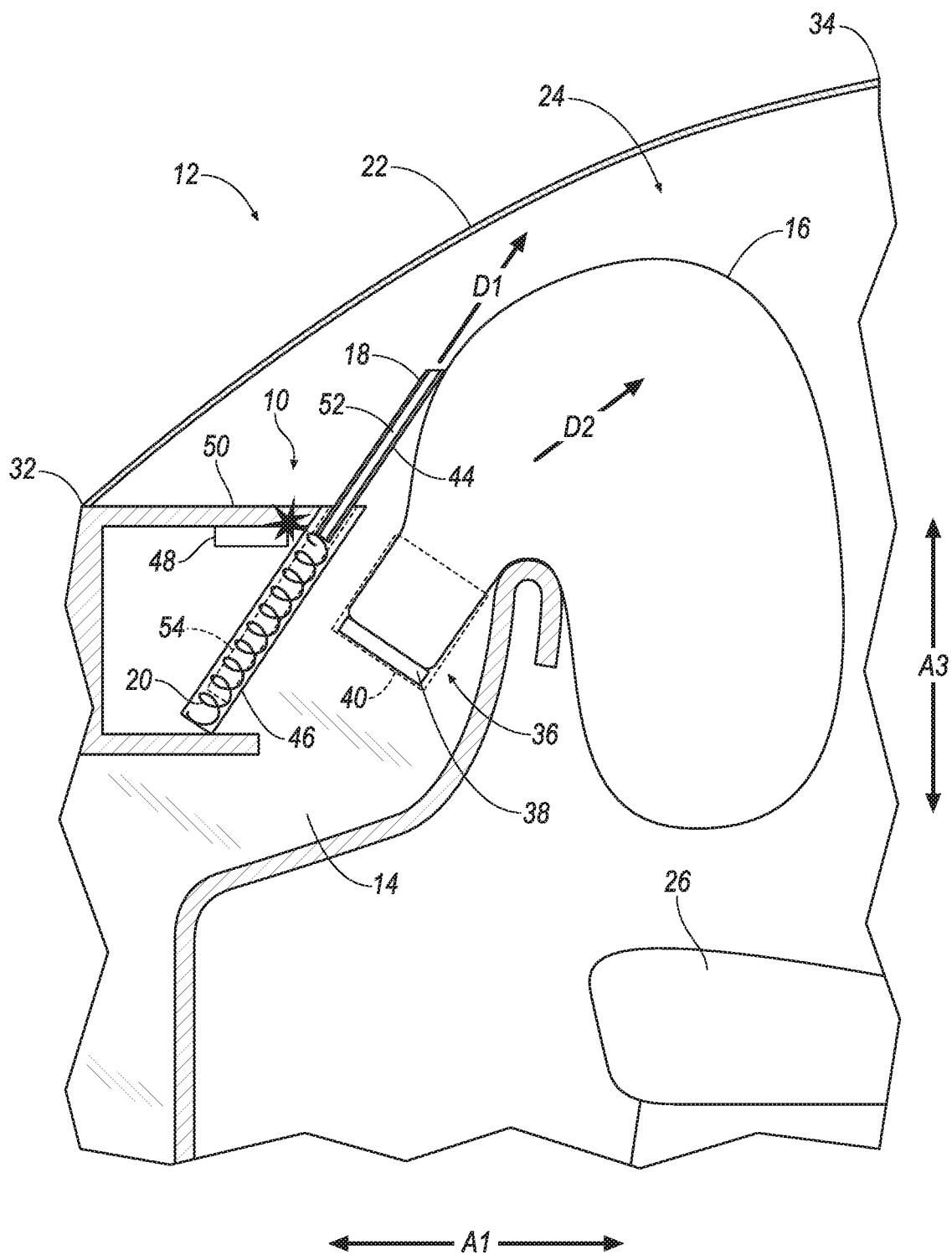
FIG. 5 is a cross-sectional view of the passenger cabin with the deployable panel of the example assembly of FIG. 4 in the extended position and the airbag in the inflated position.

The deployable panel 18 is in the retracted position when the airbag 16 is uninflated, as shown in FIGS. 1 and 4, and the deployable panel 18 is released to the extended position when the airbag 16 is in the inflated position, as shown in FIGS. 3 and 5. In the extended position, the deployable panel 18 guides the direction of inflation of the airbag 16. As an example, this allows for the airbag 16 to be positioned vehicle-rearward of a windshield 22 in a position that does not use the windshield 22 as a reaction surface for the airbag 16. In such an example, this reduces design constraints on the vehicle-forward position of the windshield 22 and/or upward angle of the windshield 22.

The vehicle 12 may be any type of passenger or commercial automobile, such as a car, a truck, a sport utility vehicle, a crossover vehicle, a van, a minivan, a taxi, a bus, etc. The vehicle 12 defines a vehicle-longitudinal axis A1, e.g., extending between a front and a rear of the vehicle 12. The vehicle 12 defines a cross-vehicle axis A2, e.g., extending between a left side and a right side of the vehicle 12. The vehicle 12 defines a vehicle-vertical axis A3, e.g., extending between a top and a bottom of the vehicle 12. The vehicle-longitudinal axis A1, the cross-vehicle axis A2, and the vehicle-vertical axis A3 are perpendicular to each other. The top, bottom, front, rear, left and right sides, and relative directions used herein (such as forward, rearward, upward, downward, etc.) may be relative to an orientation of an occupant of the vehicle 12. The top, bottom, front, rear, left and right sides, and relative directions used herein may be relative to an orientation of controls for operating the vehicle 12, e.g., an instrument panel. The top, bottom, front, rear, left and right sides, and relative directions used herein may be relative to a driving direction of the vehicle 12 when wheels of the vehicle 12 are all parallel with each other.

The vehicle 12 includes a passenger cabin 24. The passenger cabin 24 includes one or more seats 26. The seats 26 are shown as bucket seats, but the seats 26 may be other types, such as bench seats. The seats 26 may face the vehicle interior component 14. In other words, a seat bottom of the seat 26 may extend from a seatback of the seat 26 toward the vehicle interior component 14.

With reference to FIGS. 1-5, the vehicle interior component 14 may be disposed at a forward end of the passenger cabin 24 and may face toward the seats 26. The vehicle interior component 14 is located inside of the passenger cabin 24. The vehicle interior component 14 may be elongated along the cross-vehicle axis A2. In some examples, the vehicle interior component 14 may be an instrument panel (as shown in FIGS. 1-5) that includes one or more instruments 28, such as gauges, displays, etc. The vehicle interior component 14 may include vehicle controls 30, such as a steering wheel, a touch screen interface, button, nobs, switches, etc. Other examples of the vehicle interior component 14 may include a door panel.

The windshield 22 extends upwardly from the vehicle interior component 14. Specifically, the windshield 22 may extend from the vehicle interior component 14 to a roof. The windshield 22 is transparent. The windshield 22 may be at the forward end of the passenger cabin 24. The windshield 22 may include a bottom edge 32 and a top edge 34. The bottom edge 32 is forward of the top edge 34. In other words, the top edge 34 may be between the bottom edge 32 and the seats 26 relative to the vehicle-longitudinal axis A1. In another example, the windshield 22 may be generally vertical. For example, the top edge 34 may be generally vertical of the bottom edge 32 relative to the vehicle-vertical axis A3.

The assembly 10 includes an airbag assembly 36. The airbag assembly 36 includes the airbag 16 and an inflator 38 and may include a housing 40. The airbag assembly 36 may be positioned to be a passenger airbag assembly. In the example shown in the Figures, the vehicle 12 may be an autonomous vehicle without a steering wheel, and in such an example, the vehicle 12 may include two assemblies 10, i.e., one in front of the left front seat and another in front of the right front seat. In an example in which the vehicle 12 includes a steering wheel, the vehicle 12 may have one assembly 10 in front of the passenger seat, e.g., the right front seat. Alternatively, the vehicle 12 may have any suitable number of assemblies 10 in any suitable position.

The airbag 16 is mounted to the vehicle interior component 14, e.g., via the housing 40. The housing 40 houses the airbag 16 in an uninflated position, as shown in FIG. 4, and supports the airbag 16 in the inflated position, as shown in FIG. 5. The airbag 16 may be rolled and/or folded to fit within the housing 40 in the uninflated position. The housing 40 may be of any suitable material, e.g., a rigid polymer, a metal, a composite, or a combination of rigid materials. The housing 40 may be supported by the vehicle interior component 14.

The airbag 16 may be a woven polymer or any other material. As one example, the airbag 16 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 38 is in fluid communication with the airbag 16, e.g., via tubing or other structure to transfer inflation medium from the inflator 38 to the airbag 16. Upon receiving an instruction, such as an electrical pulse, from, e.g., a controller 42, the inflator 38 may inflate the airbag 16 with an inflatable medium, such as a gas, to the inflated position. The inflator 38 may be, for example, a pyrotechnic inflator that uses a chemical reaction to drive inflation medium to the airbag 16. The inflator 38 may be of any suitable type, for example, a cold-gas inflator. The inflator 38 may be supported by the housing 40 or at any other suitable vehicle location. Inflation of the airbag 16 may tear, separate, or otherwise deform the vehicle interior component 14 (as shown in FIG. 5).

Figure 2:
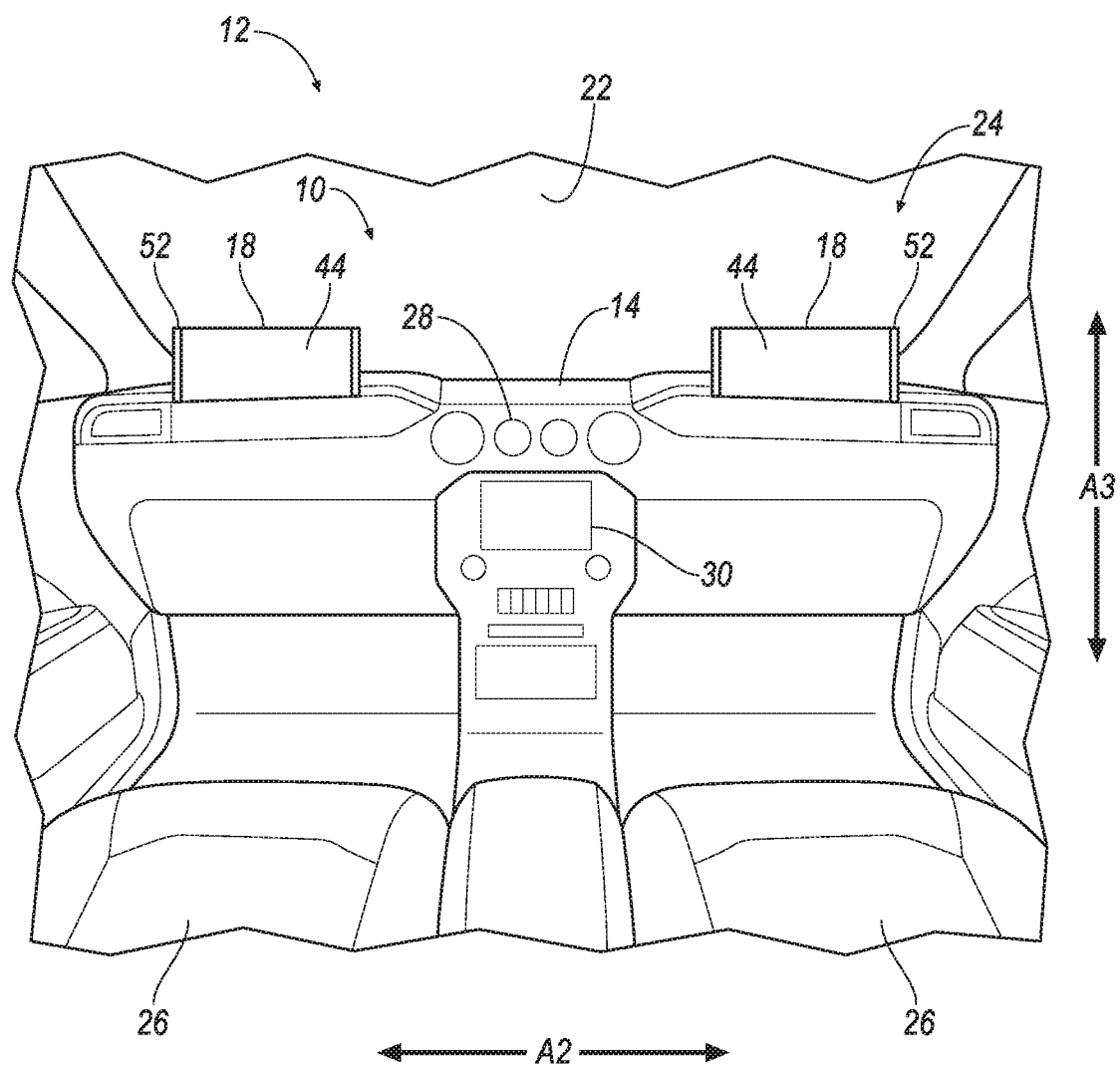
FIG. 2 is a forward view of the passenger cabin with a deployable panel of the example assembly in the extended position.

The deployable panel 18 is moveable relative to the vehicle interior component 14 between the retracted position, as shown in FIGS. 1 and 4, and the extended position, as shown in FIGS. 2, 3, and 5. The deployable panel 18 in the extended position is positioned to be between the windshield 22 and the airbag 16 in the inflated position. The deployable panel 18 has a reaction surface 44 that may face generally rearward, e.g., toward one of the seats 26, etc.

As set forth above, the deployable panel 18 is adjacent the airbag 16. In other words, the deployable panel 18 is positioned such that, when the deployable panel 18 is in the extended position and the airbag 16 is inflated, the airbag 16 impacts the deployable panel 18 and the deployable panel 18 directs the movement of the airbag 16 during inflation. For example, the reaction surface 44 may be positioned to abut the airbag 16 in the inflated position when the deployable panel 18 is in the extended position, limiting movement of the airbag 16 toward the windshield 22 and positioning the airbag 16 relative to the vehicle interior component 14, the seat 26, etc.

The deployable panel 18 is supported by the vehicle interior component 14. For example, the vehicle interior component 14 defines a cavity 46 that supports the deployable panel 18. The deployable panel 18 may be positioned in the cavity 46 in the retracted position and extendable from the cavity 46 to the extended position. The deployable panel 18 may be elongated along the cross-vehicle axis A2. The deployable panel 18 is rigid relative to the airbag 16. The deployable panel 18 may be, for example, plastic.

The deployable panel 18 is translatable between the retracted position (as shown in FIG. 4) and the extended position (as shown in FIG. 5). "Translatable" means that there is no rotation component in the movement of the deployable panel 18. The deployable panel 18 may translate relative to the vehicle interior component 14. For example, the deployable panel 18 is translatable to the extended position in a first direction D1, and the airbag 16 is inflatable to the inflated position in a second direction D2 that is transverse to the first direction D1. In other words, the direction D2 of the airbag 16 during deployment is different than the direction D1 of the deployable panel 18 as the deployable panel 18 moves from the retracted position to the extended position. For example, the first direction D1 may be generally upward, and the second direction D2 may be generally rearward. As another example, the first direction D1 may be toward a roof of the vehicle 12, and the second direction D2 may be toward one of the seats 26. The second direction D2 may be in part defined by the deployable panel 18. For example, reaction forces between the airbag 16 and the reaction surface 44 may urge the airbag 16 to inflate transverse to the reaction surface 44. The reaction surface 44 in the extended position may be between the windshield 22 and the seat 26, e.g., positioning the airbag 16 in the inflated position closer to the seat 26 than if the windshield 22 functioned as a reaction surface for the airbag 16.

While the deployable panel 18 is shown and discussed as being extendable from the vehicle interior component 14 (e.g., such as an instrument panel), the deployable panel 18 may be extendable from, for example, a door panel. In one example, a deployable panel may provide a reaction surface for a side airbag when a side window is missing (e.g., broken due to a vehicle impact).

With reference to FIGS. 4 and 5, the spring 20 may be positioned between the vehicle interior component 14 and the deployable panel 18. For example, the spring 20 may be positioned in the cavity 46 and may bias the deployable panel 18 toward the extended position. In one example, the spring 20 may be positioned at the bottom of the cavity 46. The spring 20 may store mechanical energy when the deployable panel 18 is in the retracted position. The spring 20 is designed to release the mechanical energy and urge the deployable panel 18 toward the extended position when an actuator 48 is actuated, as described below. The spring 20 may be, for example, a coil spring, a torsion spring, a compression spring, a V-spring, a gas spring, etc.

The actuator 48 is releasably coupled to the deployable panel 18. The actuator 48 may be releasably coupled to, for example, a top surface of the deployable panel 18, a side surface of the deployable panel 18, between a bottom surface of the deployable panel 18 and a top of the spring 20, or a combination thereof, when the deployable panel 18 is in the retracted position. The actuator 48 may be supported by the vehicle interior component 14. For example, the actuator 48 may be connected to a bottom surface of a top panel 50 of the vehicle interior component 14, e.g., via a fastener or other mechanical attachment.

The actuator 48 can be uncoupled from the deployable panel 18, i.e., releasable, such that the spring 20 moves the deployable panel 18 toward the actuator 48. The actuator 48 may counter-act the bias of the spring 20 when the deployable panel 18 is in the retracted position. In some examples, the actuator 48 may be a pyrotechnic release that includes pyrotechnic material which detonates upon actuation, e.g., upon receiving an instruction, such as an electrical pulse, from the controller 42. Upon detonation, the spring 20 moves the deployable panel 18 toward the actuator 48. For example, the spring 20 may move the deployable panel 18 generally upward toward the actuator 48. As another example, the spring 20 may move the deployable panel 18 toward a roof of the vehicle 12. Other examples of the actuator 48 may include a linear actuator, a solenoid actuator, a pneumatic actuator, a piezoelectric actuator, and/or another suitable actuator that translates the deployable panel 18 between the retracted position and the extended position.

The assembly 10 may include a slidable rail 52 positioned between the deployable panel 18 and the vehicle interior component 14. The slidable rail 52 may be supported by the vehicle interior component 14. For example, the slidable rail 52 may be supported by the cavity 46. The deployable panel 18 may be fixed to the slidable rail 52. In one example, a side surface of the deployable panel 18 is attached to the slidable rail 52. The side surface of the deployable panel 18 faces the cross-vehicle axis A2. The slidable rail 52 permits translational movement, i.e., linear movement, of the deployable panel 18 relative to the vehicle interior component 14 and restricts other movement (e.g., rotational) of the deployable panel 18. A track 54 guides the slidable rail 52 and the deployable panel 18 to the extended position as the actuator 48 is detonated. Although the slidable rail 52 is shown and discussed as permitting translational movement of the deployable panel 18, other suitable structures, such as a track, roller, tongue and groove, etc., may be utilized to permit linear movement of the deployable panel 18.

Figure 6:
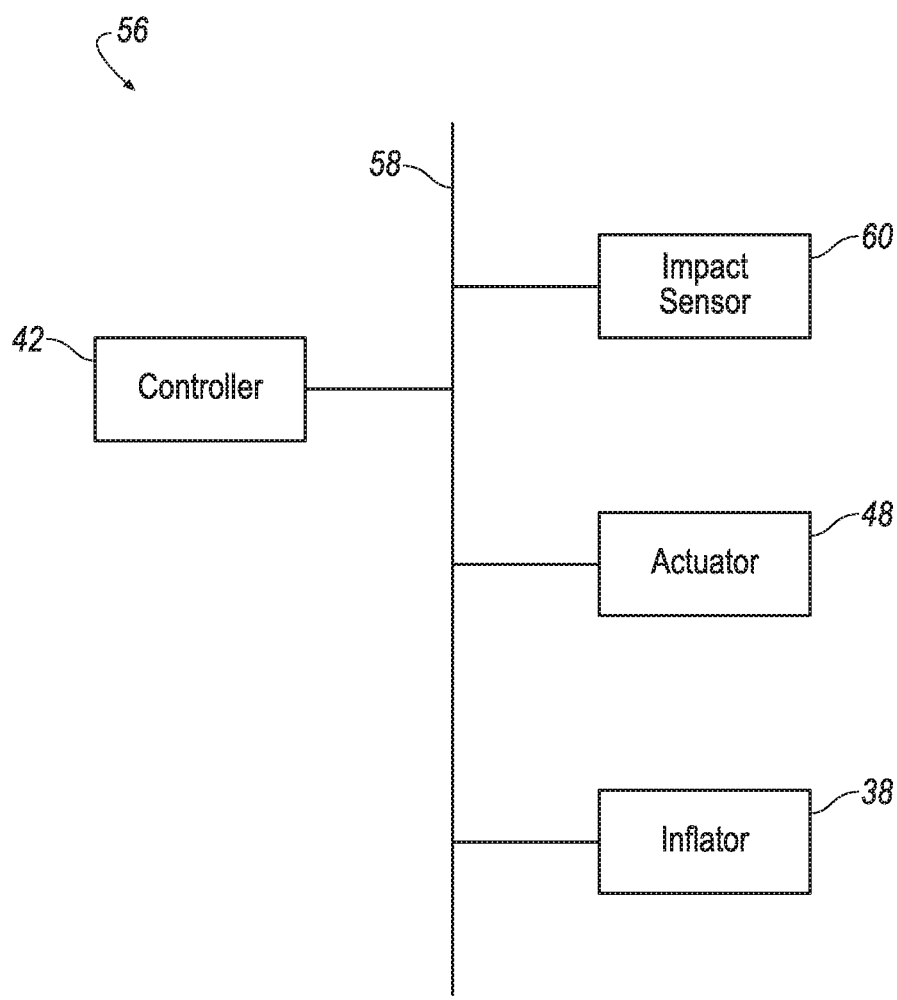
FIG. 6 is a block diagram of a control system for the vehicle.

With reference to FIG. 6, a control system 56 for the vehicle 12 is presented. The control system 56 may include a communications network 58, an impact sensor 60, the controller 42, the actuator 48, and the inflator 38. The control system 56 may transmit signals through the communications network 58, such as a controller area network (CAN) bus, Ethernet, Wi-Fi, local interconnect network (LIN), and/or by any other wired or wireless communications network. The controller 42 may be in communication with the impact sensor 60, the actuator 48, and the inflator 38 via the communications network 58.

The impact sensor 60 is adapted to detect an impact to the vehicle 12. The impact sensor 60 may be of any suitable type, for example, post-contact sensors such as linear or angular accelerometers, gyroscopes, pressure sensors, and contact switches; and pre-impact sensors such as radar, lidar, and vision-sensing systems. The vision-sensing systems may include one or more cameras, charge-coupled device (CCD) image sensors, complimentary metal-oxide-semiconductor (CMOS) image sensors, etc. The impact sensor 60 may be located at numerous points in or on the vehicle 12.

The controller 42 may be a microprocessor-based controller. The controller 42 may include a processor, memory, etc. The memory of the controller 42 may store instructions executable by the processor as well as data and/or databases. The controller 42 may be a restraint control module and may control the deployable panel 18, seatbelts, etc., of the vehicle 12.

The controller 42 may be programmed to determine an impact to the vehicle 12. For example, the controller 42 may determine that a vehicle impact has occurred based on information received from the impact sensor 60 via the communications network 58.

The controller 42 may be programmed to actuate the actuator 48 in response to a vehicle impact. For example, the controller 42 may transmit an instruction via the communications network 58 to the actuator 48 to detonate the pyrotechnic material. Upon detonation, the spring 20 biases the deployable panel 18 toward the extended position.

The controller 42 may be programmed to actuate the inflator 38 after detonation of the actuator 48. In one example, the controller 42 may be programmed to actuate the inflator 38 after the deployable panel 18 has reached the extended position. The controller 42 may, for example, transmit an instruction via the communications network 58 to the inflator 38 to inflate the airbag 16 with inflatable medium to the inflated position. The deployable panel 18 controls movement of the airbag 16 during inflation. For example, the reaction surface 44 may be positioned to abut the airbag 16 in the inflated position when the deployable panel 18 is in the extended position.

Computing devices, such as the controller 42 generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an engine control unit (ECU). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a vehicle interior component;
   an airbag mounted to the vehicle interior component;
   a deployable panel supported by the vehicle interior component adjacent the airbag, the deployable panel being movable relative to the vehicle interior component between a retracted position and an extended position; and
   a spring between the vehicle interior component and the deployable panel and biasing the deployable panel toward the extended position;
   an actuator releasably coupled to the deployable panel;
   the spring biasing the deployable panel toward the actuator.

2. The assembly of claim 1, wherein the actuator is a pyrotechnic release.

3. The assembly of claim 1, wherein the vehicle interior component defines a cavity, the deployable panel being in the cavity in the retracted position and extendable from the cavity to the extended position.

4. The assembly of claim 1, further comprising a slidable rail between the deployable panel and the vehicle interior component.

5. The assembly of claim 1, wherein the deployable panel is translatable between the retracted position and the extended position.

6. The assembly of claim 1, further comprising a windshield, the deployable panel being positioned to be between the airbag and the windshield in the extended position.

7. The assembly of claim 1, wherein the deployable panel has a reaction surface positioned to abut the airbag in an inflated position when the deployable panel is in the extended position.

8. The assembly of claim 1, wherein the vehicle interior component is an instrument panel.

9. The assembly of claim 1, further comprising a controller programed to actuate the actuator in response to a vehicle impact.

10. The assembly as set forth in claim 1, wherein the deployable panel is rigid relative to the airbag.

11. The assembly as set forth in claim 1, wherein the deployable panel is elongated in a cross-vehicle direction.

12. An assembly, comprising:
    a vehicle interior component;
    an airbag mounted to the vehicle interior component;
    a deployable panel supported by the vehicle interior component adjacent the airbag, the deployable panel being movable relative to the vehicle interior component between a retracted position and an extended position;
    a spring between the vehicle interior component and the deployable panel and biasing the deployable panel toward the extended position; and
    a windshield, the deployable panel being positioned to be between the airbag and the windshield in the extended position.

13. The assembly of claim 12, wherein the deployable panel is translatable between the retracted position and the extended position.

14. The assembly as set forth in claim 12, wherein the deployable panel is rigid relative to the airbag.

15. The assembly as set forth in claim 12, wherein the deployable panel is elongated in a cross-vehicle direction.

16. An assembly, comprising:
    a vehicle interior component, the vehicle interior component is an instrument panel;
    an airbag mounted to the vehicle interior component;
    a deployable panel supported by the vehicle interior component adjacent the airbag, the deployable panel being movable relative to the vehicle interior component between a retracted position and an extended position; and
    a spring between the vehicle interior component and the deployable panel and biasing the deployable panel toward the extended position.

17. The assembly of claim 16, wherein the deployable panel is translatable between the retracted position and the extended position.

18. The assembly as set forth in claim 16, wherein the deployable panel is rigid relative to the airbag.

19. The assembly as set forth in claim 16, wherein the deployable panel is elongated in a cross-vehicle direction.

20. The assembly of claim 16, wherein the deployable panel has a reaction surface positioned to abut the airbag in an inflated position when the deployable panel is in the extended position.

* * * * *